3,070,503
PYRILAMINE RESIN ABSORBATE WITH ASPIRIN AND/OR ASCORBIC ACID
Sheldon Siegel, Westfield, Russell H. Pettebone, Fanwood, and Edward J. Hanus, Palisade, N.J., assignors to Merck & Co., Inc., Rahway, N.J., a corporation of New Jersey
No Drawing. Filed May 22, 1959, Ser. No. 814,985
4 Claims. (Cl. 167—65)

This invention relates to pharmaceutical preparations containing pyrilamine and more particularly to preparations in which pyrilamine is adsorbed on a synthetic cation exchange resin.

Pyrilamine is one of the most commonly used antihistamines. It has found wide acceptance in the treatment of various allergic disorders and is now commonly combined with other medicaments for the treatment of the common cold. For example, preparations containing pyrilamine maleate, aspirin and/or ascorbic acid are particularly effective for the symptomatic treatment of the common cold.

However, it has been found that pyrilamine salts such as pyrilamine maleate, pyrilamine hydrochloride and the like are incompatible with aspirin and ascorbic acid. Consequently, preparations containing a pyrilamine salt, aspirin and/or ascorbic acid are highly unstable and decompose quite rapidly. Therefore, such preparations must of necessity by prepared and consumed in relatively short periods of time in order to insure against the loss of their original therapeutic activity. It is obvious then, that a stable preparation of pyrilamine and aspirin and/or ascorbic acid retaining its original therapeutic activity, and therefore having utility over long periods, is highly desirable.

Although the problem has been described with particular reference to aspirin and ascorbic acid it is apparent that it applies to and includes other ingredients which are incompatible with pyrilamine salts.

In accordance with the present invention, it has been found that by contacting a synthetic cation exchange resin with pyrilamine base or a salt thereof there is produced a stable pyrilamine adsorption product which is compatible with aspirin, ascorbic acid and mixtures of the same. Preparations containing the pyrilamine resin adsorbate, aspirin and/or ascorbic acid are unusually stable and retain their original therapeutic activity over long periods of time. In addition, the pyrilamine in this form is substantially tasteless, odorless, and particularly well adsorbed when administered orally.

The resin adsorption products of this invention are preferably prepared by contacting a synthetic cation exchange resin of suitable low toxicity with a pyrilamine salt in the form of an aqueous solution at an acid to neutral pH. In general, contact is made at pH's ranging from about 4 to 7 utilizing sufficient resin to adsorb the major part of the pyrilamine. Various salts of pyrilamine such as pyrilamine maleate, pyrilamine hydrochloride and the like may be used. The resulting suspension is then agitated at room temperature, that is, from about 15° to about 25° C. (although satisfactory results are obtained at materially higher or lower temperatures) until substantially no more pyrilamine is adsorbed. The solid product is then filtered, washed and dried to constant weight.

A variation of the above procedure which may also be used comprises dissolving pyrilamine base in a suitable water miscible solvent and contacting the resulting solution with the resin at pH's ranging from about 8 to 10. Although various water miscible solvents which are solvents for pyrilamine base may be used the lower alkyl alcohols are preferred.

The synthetic cation exchange resins which may be used to prepare the products of this invention should of course be non-toxic since they are to be administered orally together with the pyrilamine. However, this presents no problem since a small amount of resin is capable of adsorbing sufficient pyrilamine necessary for a therapeutically effective dose. Synthetic cation exchange resins which derive their exchange activity essentially from weakly acidic or strongly acidic groups may be used. Such resins are generally referred to in the art as weakly acidic or strongly acidic cation exchange resins. The composition of the resin matrix to which the active groups are attached is relatively unimportant so long as the matrix is such that the resin is rendered insoluble in ordinary solvents. The resins may be employed either in their acidic, i.e. hydrogen-ion or their salt form, the latter being preferred when the adsorption products are prepared using pyrilamine in the form of a salt. Synthetic cation exchange resins which derive their exchange activity from carboxylic acid groups are particularly useful and preferred. Resins which are polyacrylic acid or polymethacrylic acid in which the molecules are cross linked with polyvinyl aromatic compounds, such as divinylbenzene may be used. Resins of this type are described in U.S. Patent 2,340,111. A number of these resins are available commercially from the Rohm & Haas Company under the name "Amberlites," e.g. Amberlite IRC–50, Amberlite XE–64, Amberlite XE–97, Amberlite XE–89 and so forth. Ion exchange resins containing sulfonic acid groups are also useful. Resins which are copolymers of sulfonic polystyrenes and divinyl aromatic compounds, such as divinylbenzene may be used. Such resins are available commercially under the trade name "Dowex 50." These resins contain varying proportions of divinylbenzene as the cross linking component. This type of resin is described in U.S. Patent 2,366,007.

Examples of the preparation of the product will make the procedures clear. It is to be understood, however, that the examples are intended for purposes of illustration only and are not intended as in any way limiting the scope of this invention which is defined in the appended claims.

*Example I*

200 grams of Amberlite XE–97 ion exchange resin in sodium form was washed with water. To the wet resin was added a solution containing 200 grams of pyrilamine maleate dissolved in 4 liters of water and the resulting suspension agitated at 25° C. for 24 hours. The resin material was filtered and washed first with water, then with methanol and finally with acetone. The dried white resin adsorbate was found to contain 25.1% by weight pyrilamine.

This product was exposed to synthetic gastric juice (1.4 grams sodium chloride, 0.5 gram potassium chloride, 0.06 gram calcium chloride, 6.94 grams of 36% hydrochloric acid and 3.2 grams of pepsin diluted to one liter) for 1 hour at 98.6° F. utilizing 1 gram of the resin adsorbate and a 100 ml. of solution. Substantially all the pyrilamine was removed from the resin by this treatment. This demonstrates the ease with which the product is eluted under conditions occurring in the stomach.

*Example II*

2 kilograms of Amberlite XE–64 ion exchange resin in sodium form was washed with water. To a suspension of the resin in 6 liters of water was added 4 liters of an aqueous solution containing 2 kilograms of pyrilamine maleate. The suspension was agitated for 18 hours at 24 to 26° C. The resin material was filtered and washed first with water and then with acetone. The dried white resin adsorbate contained 46.6% by weight pyrilamine.

Example III 10 grams of Amberlite XE–64 ion exchange resin in sodium form was washed with water. To the wet resin was added a solution containing 10 grams of pyrilamine maleate dissolved in 50 ml. of water and the resulting suspension agitated at 25° C. for 24 hours. The resin material was filtered, washed first with water and then with acetone. The dried white resin adsorbate contained 42.9% by weight pyrilamine.

Example IV 100 grams of Dowex 50W–X8 (200 to 400 mesh) ion exchange resin in sodium form was washed with water. Dowex 50W–X8 ion exchange resin is a sulfonated copolymer of polystyrene and approximately 8% divinylbenzene. To the wet resin was added a solution containing 50 grams of pyrilamine maleate dissolved in one liter of water and the resulting suspension agitated at 25° C. for 19 hours. The resin material was filtered, washed with water, then washed with water saturated with carbon dioxide, then again washed with water and finally washed with acetone. The dried tan resin adsorbate contained 33.9% by weight pyrilamine.

Example V 10 grams of Amberlite XE–97 ion exchange resin in acid form was slurried with a solution containing 10 grams of pyrilamine base dissolved in 100 ml. of 90% methanol at 25° C. for 24 hours. The resin material was filtered and washed with 90% methanol. The dried white resin adsorbate contained 19.0% by weight pyrilamine.

Example VI 7.5 grams of the pyrilamine resin adsorbate prepared according to the process of Example I, 30.0 grams of aspirin and 1.9 grams of talc were blended dry, granulated and readily formed into 100 tablets. A similar product was prepared utilizing pyrilamine maleate. It was found that the product prepared from the resin adsorbate was stable and retained substantially all of its original activity even when stored at 40° C. for four months whereas the product prepared with pyrilamine maleate decomposed (as evidenced by a significant discoloration of the product) after several days.

Example VII 7.5 grams of the pyrilamine resin adsorbate prepared according to the process of Example I, 2.0 grams of ascorbic acid and 15.0 grams of dicalcium phosphate were blended dry, granulated and formed into 100 tablets. A similar product was prepared utilizing pyrilamine maleate. Again it was found that the product prepared for the resin adsorbate was stable and retained substantially all of its original activity when stored at 40° C. for four months whereas the product prepared with pyrilamine maleate decomposed after several days.

Example VIII 7.5 grams of the pyrilamine resin adsorbate prepared according to the process of Example I, 30.0 grams of aspirin and 2.0 grams of ascorbic acid were blended dry, granulated and formed into 100 tablets. A similar product was prepared using pyrilamine maleate. As in the preceding examples, the product prepared from the resin adsorbate was stable and retained substantially all of its original activity when stored at 40° C. for four months whereas the product prepared with pyrilamine maleate decomposed after several days.

Although the amount of pyrilamine adsorbed on the resin varies depending on the conditions employed and especially on the ratio of pyrilamine to adsorbing resin, it has been found that preparations of pyrilamine adsorbed on the resin in which the content of pyrilamine in the dried final product amounted to 10% to 70% are quite satisfactory for incorporation into various pharmaceutical dosage forms.

The products of this invention can be used as such, which is in substantially moisture-free form or they can be intermixed with other pharmaceutical ingredients or excipients. For example, it may be desired to give it in capsules, pills, tablets or even as a powder. They can be intermixed with flavoring agents, sweetening agents, binders and other materials of this type. Because of the incompatibility of aspirin and ascorbic acid with pyrilamine salts, the products of this invention are particularly useful when blended with these ingredients. Although the amounts of active ingredients may vary, therapeutically effective preparations per unit dosage may contain from about 3 to 40 milligrams of pyrilamine (in adsorbate form), 60 to 600 milligrams of aspirin and/or 10 to 250 milligrams of ascorbic acid.

We claim:

1. A preparation containing at least one ingredient selected from the group consisting of aspirin and ascorbic acid and a pharmaceutically acceptable synthetic cation exchange resin having adsorbed thereon pyrilamine.
2. A preparation of claim 1 wherein the preparation contains aspirin.
3. A preparation of claim 1 wherein the preparation contains ascorbic acid.
4. A preparation of claim 1 wherein the preparation contains a mixture of aspirin and ascorbic acid.

References Cited in the file of this patent

UNITED STATES PATENTS

| | | |
|---|---|---|
| 2,803,933 | Bouchard | Apr. 15, 1958 |
| 2,838,440 | Thurmon | June 10, 1958 |

OTHER REFERENCES

Federation Proceedings, 17:1, Part I, March 1958, p. 414, No. 1635.

Becker: Reprint from Toxicology and Applied Pharm., vol. 1, No. 1, January 1959, pp. 42–54.

The American Drug Index, J. B. Lippincott Co., Phila., 1958, pp. 510–515.

Abrahams: The Lancet, II:7009, December 28, 1957, pp. 1317, 1318.

The Amer. Drug Index, J. B. Lippincott Co., Phila., 1958, p. 616.